United States Patent Office 3,833,540
Patented Sept. 3, 1974

3,833,540
POLYURETHANE PLASTIC COMPOSITIONS CONTAINING HALOGENATED ARYL COMPOUNDS AS FLAME RETARDANTS
Arnold L. Anderson, Alma, Mich., assignor to Michigan Chemical Corporation, St. Louis, Mich.
No Drawing. Continuation-in-part of abandoned application Ser. No. 260,240, June 6, 1972. This application Feb. 8, 1973, Ser. No. 330,785
The portion of the term of the patent subsequent to July 16, 1991, has been disclaimed
Int. Cl. C08g 51/60
U.S. Cl. 260—45.9 R          29 Claims

ABSTRACT OF THE DISCLOSURE

Plastic compositions containing polyurethanes and halogenated aryl compounds having the formula

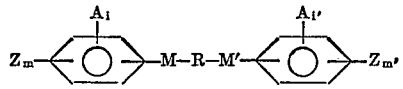

wherein Z is bromine or chlorine, $m$ and $m'$ are integers having a value of 1–5, $i$ and $i'$ are integers having a value of 0–2, R is herein defined, M and M' are each independent and are from the group oxygen, nitrogen or sulfur with the proviso that M and M' cannot concurrently be oxygen in both cases, and A is chlorine, cyano, nitro, lower alkoxy, lower alkyl, fluorine, dialkylamino, phenyl, halo-phenyl, benzyl, or halo-benzyl.

---

This application is a continuation-in-part of copending application Ser. No. 260,240, filed June 6, 1972 and now abandoned. The entire specification of this case, Ser. No. 260,240, is to be considered as incorporated herein by reference.

The prior art considered in conjunction with the preparation of this application is as follows: U.S. 2,130,990; U.S. 2,186,367; U.S. 2,329,033; U.S. 3,666,692; U.S. 3,-686,320; U.S. 3,658,634; German Pat. No. 1,139,636; German Pat. No. 2,054,522; Japanese Pat. No. (72) 14,500 as cited in Volume 77, Chemical Abstracts, column 153737k (1972); Chemical Abstracts, Volume 13, column 4485; Chemical Abstracts, Volume 31, column 7045[9]; and Journal of the Chemical Society, pages 2972–2976 (1963). All of these publications are to be considered as incorporated herein by reference.

The present invention relates to plastic compositions containing polyurethanes (including, without limitation, rigid foams, semi-rigid foams, flexible foams, rubbers and adhesives). More specifically, the present invention covers plastic compositions containing polyurethanes and certain halogenated aryl compounds (hereinafter defined) as flame retardants for said plastic compositions.

Polyurethanes and utility thereof are known in the art as exemplified by Polyurethanes, B. A. Dombrow (Reinhold Plastics Applications Series), Reinhold Publishing Corporation, New York, 1965 and Modern Plastics Encyclopedia 1972–1973, Vol. 49: No. 10A October 1972, pages 110, 112, 162, 276, 278, 279, 282 and 283 and which publications are in toto incorporated herein by reference.

The need for flame retarding polyurethanes has also been recognized in the art as exemplified by U.S. 3,347,-822 and Modern Plastics Encyclopedia, ibid, pages 222, 456–458 and which publications are in toto incorporated herein by reference.

The resultant disadvantages in the utilization of various prior art materials as flame retardants for polyurethanes include, without limitation, factors such as thermal migration, heat instability, light instability, non-biodegradable, toxicity, discoloration and the large amounts employed in order to be effective. Thus, there is always a demand for a material which will function as a flame retardant in polyurethanes and concurrently will not, by incorporation therein, adversely effect the chemical and/or physical and/or mechanical properties of the resultant polyurethane plastic composition.

The prior art problem of providing a flame retarded polyurethane composition having desired chemical, physical and mechanical properties has now been substantially solved by the present invention and the above-described disadvantages substantially overcome.

Accordingly, one of the main objects of the present invention is to provide polyurethane plastic compositions which are flame retarded.

Another object of the present invention is to provide a material for polyurethane plastic compositions which will not substantially adversely effect the chemical and/or physical and/or mechanical properties of said compositions.

A further object of the present invention is to provide a flame retardant which is economic and easy to incorporate into polyurethane plastics without being degraded or decomposed as a result of blending or processing operations.

It has been found that the foregoing objects can be obtained by the incorporation of a new class of halogenated aryl compounds in polyurethane to subsequently provide flame retarded compositions which exhibit outstanding chemical, physical and mechanical properties.

The halogenated aryl compounds used in the present invention compositions have the formula:

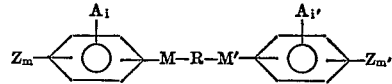

In Formula I above, Z is bromine or chlorine, $m$ and $m'$ are integers each independently having a value of 1–5; $i$ and $i'$ are integers each independently having a value of 0–2; M and M' are each independent and are from the group oxygen, nitrogen and sulfur with the proviso that M and M' cannot concurrently be oxygen in both cases and where M and/or M' is nitrogen, the formula is

A is from the group chlorine, cyano (—CN), nitro (—NO$_2$), lower alkoxy (e.g. —OCH$_3$, OC$_2$H$_5$), lower alkyl (e.g. CH$_3$, C$_2$H$_5$, C$_3$H$_4$, C$_4$H$_9$), fluorine. dialkylamino e.g. —N(CH$_3$)$_2$ N(C$_2$H$_5$)$_2$, phenyl (—C$_6$H$_5$), halo-phenyl, benzyl (—CH$_2$C$_6$H$_5$), and halo-benzyl; and R is from the group (a) alkylene: branched or straight or halo-branched chain group having from one to six carbon atoms (e.g. CH$_2$, C$_2$H$_4$, C$_3$H$_6$, C$_4$H$_8$, —C(CH$_3$)H—, —(CH$_3$)C(CH$_3$)—, —C(CH$_2$Cl)H—, —C(CHBr$_2$)H—).

(b)      CH$_2$—CH(OH)—CH$_2$ (c)      CH$_2$—CH(CH$_2$HO)—CH$_2$ (d)      (CH$_2$)$_w$—O—(CH$_2$)$_w$ where $w$=1–6

(e)
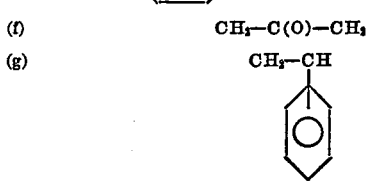

(f)      CH$_2$—C(O)—CH$_2$ (g)      CH$_2$—CH (h) 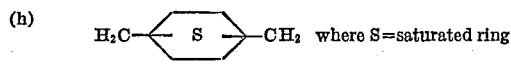 where S=saturated ring In Formula I, $i+m$ or $i'+m'$ is not greater than 5.

It is to be understood that all of the compounds falling within the above Formula I and as heretofore defined are generically described herein as "halogenated aryl" compounds.

The halogenated aryl compounds are found to be compatible with and effective additives for various polymeric systems to make the resultant polymer flame retardant.

Illustrative (but without limitation) of some of the present invention halogenated aryl compounds are shown below:

(I) 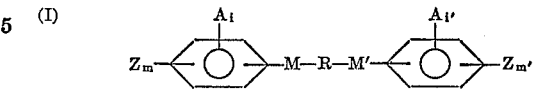

the exemplary definitions of A, Z, M, M', R, $m$, $m'$, $i$ and $i'$ are listed in Table I.

TABLE I

| Compound number | Z | m | m' | A | i | i' | R | M | M' |
|---|---|---|---|---|---|---|---|---|---|
| 1 | Br | 1 | 1 |  | 0 | 0 | $C_2H_4$ | S | S |
| 2 | Br | 1 | 3 |  | 0 | 0 | $C_2H_4$ | S | O |
| 3 | Br | 2 | 2 | Cl | 1 | 1 | $C_3H_6$ | O | N |
| 4 | Br | 2 | 2 | —CN | 1 | 1 | $C_2H_4$ | N | N |
| 5 | Br | 2 | 2 | —$NO_2$ | 1 | 1 | $C_2H_4$ | O | N |
| 6 | Cl | 2 | 2 | —$OCH_3$ | 1 | 1 | $C_2H_4$ | S | S |
| 7 | Br | 3 | 3 | —$OCH_3$ | 1 | 1 | $C_2H_4$ | S | O |
| 8 | Br | 2 | 2 | —$CH_3$ | 1 | 1 | $C_2H_4$ | N | N |
| 9 | Br | 2 | 2 | F | 1 | 1 | $C_3H_6$ | S | S |
| 10 | Br | 2 | 2 | —$N(CH_3)_2$ | 1 | 1 | $C_2H_4$ | N | N |
| 11 | Br | 2 | 2 | —$C_6H_5$ | 1 | 1 | $C_2H_4$ | N | S |
| 12 | Cl | 2 | 2 | —$C_6H_3Br_2$ | 1 | 1 | $C_2H_4$ | N | S |
| 13 | Br | 2 | 2 | —$CH_2C_6H_5$ | 1 | 1 | $C_2H_4$ | S | S |
| 14 | Br | 2 | 2 | —$CH_2C_6H_3Br_2$ | 1 | 1 | $C_2H_4$ | N | N |
| 15 | Cl | 3 | 3 | —$C_6H_3Cl_2$ | 1 | 1 | $C_3H_6$ | N | N |
| 16 | Br | 3 | 3 | F | 1 | 1 | $C_6H_{12}$ | N | O |
| 17 | Br | 2 | 1 | —$N(CH_3)_2$ | 1 | 0 | $C_3H_6$ | N | S |
| 18 | Br | 2 | 3 | —$N(CH_3)_2$ | 1 | 0 | $C_3H_6$ | N | N |
| 19 | Cl | 3 | 3 | —$C_6H_2Br_3$ | 1 | 1 | $C_2H_4$ | S | S |
| 20 | Br | 3 | 3 | Cl | 2 | 2 | $C_3H_6$ | S | N |
| 21 | Br | 2 | 2 | Cl | 1 | 1 | $CH(CH_3)CH_2$ | N | N |
| 22 | Br | 4 | 4 | Cl | 1 | 1 | $CH(CH_3)CH_2CH_2$ | S | O |
| 23 | Br | 3 | 3 | F | 2 | 2 | $CH_2CH(CH_3)CH_2CH_2$ | O | N |
| 24 | Br | 1 | 1 | —$C_4H_9$ | 1 | 1 | $CH_2$ | N | N |
| 25 | Br | 1 | 1 | —$OC_4H_9$ | 1 | 1 | $C_2H_4$ | N | O |
| 26 | Br | 3 | 3 |  | 0 | 0 | $CH_2C(CH_2Cl)H$ | N | N |
| 27 | Br | 3 | 3 |  | 0 | 0 | $CH_2C(CH_2Cl)_2$ | S | S |
| 28 | Br | 5 | 5 |  | 0 | 0 | $CH_2C(CH_2Cl)H$ | S | N |
| 29 | Br | 2 | 2 | —CN | 1 | 1 | $CH_2CH_2C(CH_2Br)H$ | S | O |
| 30 | Br | 2 | 2 | —$NO_2$ | 1 | 1 | $CH_2(CHCl_2)H$ | O | N |
| 31 | Cl | 2 | 2 | —$OCH_3$ | 1 | 1 | $CH_2C(CH_2Cl)H$ | N | N |
| 32 | Br | 3 | 3 | —$OCH_3$ | 1 | 1 | $(CH_2)_3C(CH_2Cl)_2$ | O | N |
| 33 | Br | 2 | 2 | —$CH_3$ | 1 | 1 | $CH_2C(CH_2Cl)H$ | S | S |
| 34 | Br | 2 | 2 | F | 1 | 1 | $CH_2C(CH_2Cl)_2$ | S | O |
| 35 | Br | 2 | 2 | —$N(CH_3)_2$ | 1 | 1 | $CH_2C(CHBr_2)H$ | N | N |
| 36 | Br | 2 | 2 | —$C_6H_5$ | 1 | 1 | $(CH_2)_2C(CBr_3)H$ | N | S |
| 37 | Cl | 2 | 2 | —$C_6H_3Br_2$ | 1 | 1 | $CH_2C(CH_2Cl)H$ | N | N |
| 38 | Br | 2 | 2 | —$CH_2C_6H_5$ | 1 | 1 | $CH_2C(CCl_3)_2$ | N | N |
| 39 | Br | 2 | 2 | —$CH_2C_6H_3Br_2$ | 1 | 1 | $CH_2C(CH_2Cl)H$ | S | N |
| 40 | Cl | 3 | 3 | —$C_6H_3Cl_2$ | 1 | 1 | $CH_2C(CH_2Cl)H$ | S | S |
| 41 | Br | 3 | 3 | F | 1 | 1 | $CH_2C(CCl_3)_2$ | N | N |
| 42 | Cl | 5 | 5 |  | 0 | 0 | $CH_2C(CH_2Cl)H$ | N | O |
| 43 | Br | 4 | 4 |  | 0 | 0 | $CH_2C(CH_2Cl)H$ | N | S |
| 44 | Br | 3 | 3 | —$C_6H_2Br_3$ | 1 | 1 | $(CH_2)_3C(CH_2Cl)_2$ | O | N |
| 45 | Br | 3 | 3 |  | 0 | 0 | $CH_2C(CH_2Cl)HCH_2$ | S | S |
| 46 | Br | 2 | 2 |  | 0 | 0 | $CH_2C(CCl_3)H$ | N | S |
| 47 | Br | 4 | 4 |  | 0 | 0 | $CH_2C(CHBr_2)H$ | N | N |
| 48 | Br | 3 | 3 | F | 2 | 2 | $CH_2C(CH_2Cl)H$ | N | S |
| 49 | Br | 1 | 1 | —$C_4H_9$ | 1 | 1 | $CH_2C(CH_2Cl)H$ | N | O |
| 50 | Br | 1 | 1 | —$OC_4H_9$ | 1 | 1 | $(CH_2)_3C(CH_2Cl)H$ | N | N |
| 51 | Br | 2 | 2 |  | 0 | 0 | $CH_2CH(OH)CH_2$ | S | S |
| 52 | Br | 3 | 3 |  | 0 | 0 | $CH_2CH(OH)CH_2$ | N | N |
| 53 | Cl | 2 | 2 | —CN | 1 | 1 | $CH_2CH(OH)CH_2$ | S | O |
| 54 | Br | 2 | 2 | —$NO_2$ | 1 | 1 | $CH_2CH(OH)CH_2$ | O | N |
| 55 | Br | 2 | 2 | —$OCH_3$ | 1 | 1 | $CH_2CH(OH)CH_2$ | N | N |
| 56 | Br | 3 | 3 | —$OCH_3$ | 1 | 1 | $CH_2CH(OH)CH_2$ | N | O |
| 57 | Br | 2 | 2 | —$CH_3$ | 1 | 1 | $CH_2CH(OH)CH_2$ | N | S |
| 58 | Br | 2 | 2 | F | 1 | 1 | $CH_2CH(OH)CH_2$ | O | S |
| 59 | Br | 2 | 2 | —$N(CH_3)_2$ | 1 | 1 | $CH_2CH(OH)CH_2$ | N | N |
| 60 | Br | 2 | 2 | —$C_6H_5$ | 1 | 1 | $CH_2CH(OH)CH_2$ | N | S |
| 61 | Br | 2 | 2 | —$C_6H_3Br_2$ | 1 | 1 | $CH_2CH(OH)CH_2$ | N | N |
| 62 | Br | 2 | 2 | —$CH_2C_6H_5$ | 1 | 1 | $CH_2CH(OH)CH_2$ | S | N |
| 63 | Br | 2 | 2 | —$CH_2C_6H_3Br_2$ | 1 | 1 | $CH_2CH(OH)CH_2$ | N | S |
| 64 | Br | 3 | 3 | —$C_6H_3Cl_2$ | 1 | 1 | $CH_2CH(OH)CH_2$ | S | S |
| 65 | Cl | 3 | 3 | F | 1 | 1 | $CH_2CH(OH)CH_2$ | N | N |
| 66 | Cl | 2 | 2 | —CN | 2 | 2 | $CH_2CH(OH)CH_2$ | N | O |
| 67 | Br | 4 | 4 |  | 0 | 0 | $CH_2CH(OH)CH_2$ | S | O |
| 68 | Cl | 3 | 3 | —$C_6H_2Br_3$ | 1 | 1 | $CH_2CH(OH)CH_2$ | N | O |
| 69 | Cl | 3 | 3 | —$NO_2$ | 2 | 2 | $CH_2CH(OH)CH_2$ | S | S |
| 70 | Cl | 2 | 2 | —$OCH_3$ | 1 | 1 | $CH_2CH(OH)CH_2$ | N | O |
| 71 | Cl | 4 | 4 | —$CH_3$ | 1 | 1 | $CH_2CH(OH)CH_2$ | S | O |
| 72 | Cl | 3 | 3 | F | 2 | 2 | $CH_2CH(OH)CH_2$ | N | N |
| 73 | Br | 1 | 1 | —$C_4H_9$ | 1 | 1 | $CH_2CH(OH)CH_2$ | O | N |
| 74 | Br | 1 | 1 | —$OC_4H_9$ | 1 | 1 | $CH_2CH(OH)CH_2$ | N | N |
| 75 | Br | 2 | 2 |  | 0 | 0 | $CH_2CH(CH_2OH)CH_2$ | S | S |
| 76 | Br | 3 | 3 |  | 0 | 0 | $CH_2CH(CH_2OH)CH_2$ | S | O |
| 77 | Cl | 2 | 2 |  | 0 | 0 | $CH_2CH(CH_2OH)CH_2$ | N | N |
| 78 | Br | 2 | 2 | —CN | 1 | 1 | $CH_2CH(CH_2OH)CH_2$ | N | N |
| 79 | Br | 2 | 2 | —$NO_2$ | 1 | 1 | $CH_2CH(CH_2OH)CH_2$ | O | N |
| 80 | Br | 2 | 2 | —$OCH_3$ | 1 | 1 | $CH_2CH(CH_2OH)CH_2$ | S | S |
| 81 | Br | 3 | 3 | —$OCH_3$ | 1 | 1 | $CH_2CH(CH_2OH)CH_2$ | S | O |
| 82 | Br | 2 | 2 | —$CH_3$ | 1 | 1 | $CH_2CH(CH_2OH)CH_2$ | N | N |
| 83 | Br | 2 | 2 | F | 1 | 1 | $CH_2CH(CH_2OH)CH_2$ | S | S |
| 84 | Br | 2 | 2 | —$N(CH_3)_2$ | 1 | 1 | $CH_2CH(CH_2OH)CH_2$ | N | N |
| 85 | Br | 2 | 2 | —$C_6H_5$ | 1 | 1 | $CH_2CH(CH_2OH)CH_2$ | N | S |
| 86 | Br | 2 | 2 | —$C_6H_3Br_2$ | 1 | 1 | $CH_2CH(CH_2OH)CH_2$ | S | S |
| 87 | Br | 2 | 2 | —$CH_2C_6H_5$ | 1 | 1 | $CH_2CH(CH_2OH)CH_2$ | S | S |
| 88 | Br | 2 | 2 | —$CH_2C_6H_3Br_2$ | 1 | 1 | $CH_2CH(CH_2OH)CH_2$ | N | N |
| 89 | Br | 3 | 3 | —$C_6H_3Cl_2$ | 1 | 1 | $CH_2CH(CH_2OH)CH_2$ | N | N |
| 90 | Cl | 3 | 3 | F | 1 | 1 | $CH_2CH(CH_2OH)CH_2$ | O | N |

3,833,540

TABLE I—Continued

| Compound number | Z | m | m' | A | i | i' | R | M | M' |
|---|---|---|---|---|---|---|---|---|---|
| 92 | Cl | 2 | 2 | —CN | 2 | 2 | $CH_2CH(CH_2OH)CH_2$ | S | N |
| 93 | Br | 4 | 4 | | 0 | 0 | $CH_2CH(CH_2OH)CH_2$ | O | N |
| 94 | Cl | 3 | 3 | —$C_6H_2Br_3$ | 1 | 1 | $CH_2CH(CH_2OH)CH_2$ | N | S |
| 95 | Cl | 3 | 3 | —$NO_2$ | 2 | 2 | $CH_2CH(CH_2OH)CH_2$ | N | S |
| 96 | Cl | 2 | 2 | —$OCH_3$ | 1 | 1 | $CH_2CH(CH_2OH)CH_2$ | N | O |
| 97 | Cl | 4 | 4 | —$CH_3$ | 1 | 1 | $CH_2CH(CH_2OH)CH_2$ | O | S |
| 98 | Cl | 3 | 3 | F | 2 | 2 | $CH_2CH(CH_2OH)CH_2$ | N | N |
| 99 | Br | 1 | 1 | —$C_4H_9$ | 1 | 1 | $CH_2CH(CH_2OH)CH_2$ | O | N |
| 100 | Br | 1 | 1 | —$OC_4H_9$ | 1 | 1 | $CH_2CH(CH_2OH)CH_2$ | O | N |
| 101 | Br | 2 | 2 | | 0 | 0 | $CH_2OCH_2$ | N | S |
| 102 | Br | 3 | 3 | | 0 | 0 | $CH_2OCH_2$ | N | S |
| 103 | Cl | 2 | 2 | | 0 | 0 | $(CH_2)_2O(CH_2)_2$ | S | O |
| 104 | Br | 2 | 2 | —CN | 1 | 1 | $(CH_2)_2O(CH_2)_2$ | S | N |
| 105 | Br | 2 | 2 | —$NO_2$ | 1 | 1 | $CH_2OCH_2$ | O | N |
| 106 | Br | 2 | 2 | —$OCH_3$ | 1 | 1 | $(CH_2)_3O(CH_2)_3$ | N | N |
| 107 | Br | 3 | 3 | —$OCH_3$ | 1 | 1 | $(CH_2)_2O(CH_2)_5$ | N | S |
| 108 | Br | 2 | 2 | —$CH_3$ | 1 | 1 | $CH_2OCH_2$ | S | S |
| 109 | Br | 2 | 2 | F | 1 | 1 | $CH_2OCH_2$ | O | S |
| 110 | Br | 2 | 2 | —$N(CH_3)_2$ | 1 | 1 | $CH_2OCH_2$ | N | N |
| 111 | Br | 2 | 2 | —$C_6H_5$ | 1 | 1 | $CH_2OCH_2$ | S | N |
| 112 | Br | 2 | 2 | —$C_6H_3Br_2$ | 1 | 1 | $(CH_2)_4O(CH_2)_4$ | N | N |
| 113 | Br | 2 | 2 | —$CH_2C_6H_5$ | 1 | 1 | $CH_2OCH_2$ | S | N |
| 114 | Br | 2 | 2 | —$CH_2C_6H_3Br_2$ | 1 | 1 | $(CH_2)_3O(CH_2)_3$ | N | S |
| 115 | Br | 3 | 3 | —$C_6H_3Cl_2$ | 1 | 1 | $CH_2OCH_2$ | S | N |
| 116 | Cl | 3 | 3 | F | 1 | 1 | $CH_2OCH_2$ | N | N |
| 117 | Cl | 2 | 2 | —CN | 2 | 2 | $CH_2OCH_2$ | O | S |
| 118 | Br | 4 | 4 | | 0 | 0 | $(CH_2)_2OCH_2$ | S | N |
| 119 | Cl | 3 | 3 | —$C_6H_2Br_3$ | 1 | 1 | $CH_2OCH_2$ | N | N |
| 120 | Cl | 3 | 3 | —$NO_2$ | 2 | 2 | $(CH_2)_2O(CH_2)_2$ | S | S |
| 121 | Cl | 2 | 2 | —$OCH_3$ | 1 | 1 | $CH_2OCH_2$ | N | N |
| 122 | Cl | 4 | 4 | —$CH_3$ | 1 | 1 | $CH_2OCH_2$ | S | O |
| 123 | Cl | 3 | 3 | F | 2 | 2 | $CH_2OCH_2$ | N | N |
| 124 | Br | 1 | 1 | —$C_4H_9$ | 1 | 1 | $CH_2OCH_2$ | O | N |
| 125 | Br | 1 | 1 | —$OC_4H_9$ | 1 | 1 | $CH_2OCH_2$ | N | N |
| 126 | Br | 2 | 2 | | 0 | 0 | $CH_2(C_6H_4)CH_2$ | S | N |
| 127 | Br | 3 | 3 | | 0 | 0 | $CH_2(C_6H_2Br_2)CH_2$ | S | S |
| 128 | Cl | 2 | 2 | | 0 | 0 | $CH_2(C_6H_2Cl_2)CH_2$ | O | O |
| 129 | Br | 3 | 3 | —CN | 1 | 1 | $CH_2(C_6Br_4)CH_2$ | N | N |
| 130 | Br | 2 | 2 | —$NO_2$ | 1 | 1 | $CH_2(C_6Cl_4)CH_2$ | N | O |
| 131 | Br | 2 | 2 | —$OCH_3$ | 1 | 1 | $CH_2(C_6H_4)CH_2$ | S | S |
| 132 | Br | 3 | 3 | —$OCH_3$ | 1 | 1 | $CH_2(C_6HBr_3)CH_2$ | O | S |
| 133 | Br | 2 | 2 | —$CH_3$ | 1 | 1 | $CH_2(C_6H_2Br_2)CH_2$ | N | S |
| 134 | Br | 2 | 2 | F | 1 | 1 | $CH_2(C_6Br_4)CH_2$ | S | N |
| 135 | Br | 2 | 2 | —$N(CH_3)_2$ | 1 | 1 | $CH_2(C_6HBr_3)CH_2$ | N | N |
| 136 | Br | 2 | 2 | —$C_6H_5$ | 1 | 1 | $CH_2(C_6H_4)CH_2$ | S | N |
| 137 | Br | 2 | 2 | —$C_6H_3Br_2$ | 1 | 1 | $CH_2(C_6H_4)CH_2$ | S | S |
| 138 | Br | 2 | 2 | —$CH_2C_6H_5$ | 1 | 1 | $CH_2(C_6H_2Br_2)CH_2$ | S | S |
| 139 | Br | 2 | 2 | —$CH_2C_6H_3Br_2$ | 1 | 1 | $CH_2(C_6HBr_3)CH_2$ | N | N |
| 140 | Br | 3 | 3 | —$C_6H_3Cl_2$ | 1 | 1 | $CH_2(C_6Cl_4)CH_2$ | N | N |
| 141 | Cl | 3 | 3 | F | 1 | 1 | $CH_2(C_6H_4)CH_2$ | N | O |
| 142 | Cl | 2 | 2 | —CN | 2 | 2 | $CH_2(C_6HBr_3)CH_2$ | N | O |
| 143 | Br | 4 | 4 | | 0 | 0 | $CH_2(C_6H_4)CH_2$ | S | S |
| 144 | Cl | 3 | 3 | —$C_6H_2Br_3$ | 1 | 1 | $CH_2(C_6Br_4)CH_2$ | N | N |
| 145 | Cl | 3 | 3 | —$NO_2$ | 2 | 2 | $CH_2(C_6H_4)CH_2$ | N | N |
| 146 | Cl | 2 | 2 | —$OCH_3$ | 1 | 1 | $CH_2(C_6H_4)CH_2$ | O | N |
| 147 | Cl | 4 | 4 | —$CH_3$ | 1 | 1 | $CH_2(C_6H_4)CH_2$ | S | N |
| 148 | Cl | 3 | 3 | F | 2 | 2 | $CH_2(C_6H_4)CH_2$ | N | N |
| 149 | Br | 1 | 1 | —$C_4H_9$ | 1 | 1 | $CH_2(C_6Br_4)CH_2$ | O | N |
| 150 | Br | 1 | 1 | —$OC_4H_9$ | 1 | 1 | $CH_2(C_6Br_4)CH_2$ | N | N |
| 151 | Br | 2 | 2 | | 0 | 0 | $CH_2—C(O)—CH_2$ | S | S |
| 152 | Br | 2 | 2 | | 0 | 0 | $CH_2—C(O)—CH_2$ | N | S |
| 153 | Cl | 2 | 2 | | 0 | 0 | $CH_2—C(O)—CH_2$ | S | S |
| 154 | Br | 2 | 2 | —CN | 1 | 1 | $CH_2—C(O)—CH_2$ | O | O |
| 155 | Br | 2 | 2 | —$NO_2$ | 1 | 1 | $CH_2—C(O)—CH_2$ | N | N |
| 156 | Br | 2 | 2 | —$OCH_3$ | 1 | 1 | $CH_2—C(O)—CH_2$ | S | S |
| 157 | Br | 3 | 3 | —$OCH_3$ | 1 | 1 | $CH_2—C(O)—CH_2$ | S | S |
| 158 | Br | 2 | 2 | —$CH_3$ | 1 | 1 | $CH_2—C(O)—CH_2$ | S | S |
| 159 | Br | 2 | 2 | F | 1 | 1 | $CH_2—C(O)—CH_2$ | O | S |
| 160 | Br | 2 | 2 | —$N(CH_3)_2$ | 1 | 1 | $CH_2—C(O)—CH_2$ | N | N |
| 161 | Br | 2 | 2 | —$C_6H_5$ | 1 | 1 | $CH_2—C(O)—CH_2$ | S | N |
| 162 | Br | 2 | 2 | —$C_6H_3Br_2$ | 1 | 1 | $CH_2—C(O)—CH_2$ | N | N |
| 163 | Br | 2 | 2 | —$CH_2C_6H_5$ | 1 | 1 | $CH_2—C(O)—CH_2$ | N | S |
| 164 | Br | 2 | 2 | —$CH_2C_6H_3Br_2$ | 1 | 1 | $CH_2—C(O)—CH_2$ | S | S |
| 165 | Br | 3 | 3 | —$C_6H_3Cl_2$ | 1 | 1 | $CH_2—C(O)—CH_2$ | N | N |
| 166 | Cl | 3 | 3 | F | 1 | 1 | $CH_2—C(O)—CH_2$ | O | N |
| 167 | Cl | 2 | 2 | —CN | 2 | 2 | $CH_2—C(O)—CH_2$ | N | N |
| 168 | Br | 4 | 4 | | 0 | 0 | $CH_2—C(O)—CH_2$ | S | S |
| 169 | Cl | 3 | 3 | —$C_6H_2Br_3$ | 1 | 1 | $CH_2—C(O)—CH_2$ | S | S |
| 170 | Cl | 3 | 3 | —$NO_2$ | 2 | 2 | $CH_2—C(O)—CH_2$ | N | S |
| 171 | Cl | 2 | 2 | —$OCH_3$ | 1 | 1 | $CH_2—C(O)—CH_2$ | N | N |
| 172 | Cl | 4 | 4 | —CN | 1 | 1 | $CH_2—C(O)—CH_2$ | N | N |
| 173 | Cl | 3 | 3 | F | 2 | 2 | $CH_2—C(O)—CH_2$ | O | N |
| 174 | Br | 1 | 1 | —$C_4H_9$ | 1 | 1 | $CH_2—C(O)—CH_2$ | O | N |
| 175 | Br | 1 | 1 | —$OC_4H_9$ | 1 | 1 | $CH_2—C(O)—CH_2$ | N | N |
| 176 | Br | 2 | 2 | | 0 | 0 | —$CH_2C(C_6H_5)H$— | N | N |
| 177 | Br | 2 | 2 | | 0 | 0 | —$CH_2C(C_6H_5)H$— | O | O |
| 178 | Cl | 2 | 2 | | 0 | 0 | —$CH_2C(C_6H_5)H$— | S | N |
| 179 | Br | 2 | 2 | —CN | 1 | 1 | $—CH_2C(C_6H_5)H—$ | N | N |
| 180 | Br | 2 | 2 | —$NO_2$ | 1 | 1 | —$CH_2C(C_6H_5)H$— | S | O |
| 181 | Br | 2 | 2 | —$OCH_3$ | 1 | 1 | —$CH_2C(C_6H_5)H$— | O | S |
| 182 | Br | 3 | 3 | —$OCH_3$ | 1 | 1 | —$CH_2C(C_6H_5)H$— | N | O |
| 183 | Br | 2 | 2 | —$CH_3$ | 1 | 1 | —$CH_2C(C_6H_5)H$— | N | N |
| 184 | Br | 2 | 2 | F | 1 | 1 | —$CH_2C(C_6H_5)H$— | N | S |
| 185 | Br | 2 | 2 | —$N(CH_3)_2$ | 1 | 1 | —$CH_2C(C_6H_5)H$— | N | N |
| 186 | Br | 2 | 2 | —$C_6H_5$ | 1 | 1 | —$CH_2C(C_6H_5)H$— | S | N |
| 187 | Br | 2 | 2 | —$C_6H_3Br_2$ | 1 | 1 | —$CH_2C(C_6H_5)H$— | S | S |
| 188 | Br | 2 | 2 | —$CH_2C_6H_5$ | 1 | 1 | —$CH_2C(C_6H_5)H$— | N | N |
| 189 | Br | 2 | 2 | —$CH_2C_6H_3Br_2$ | 1 | 1 | —$CH_2C(C_6H_5)H$— | N | S |
| 190 | Br | 3 | 3 | —$C_6H_3Cl_2$ | 1 | 1 | —$CH_2C(C_6H_5)H$— | S | N |
| 191 | Cl | 3 | 3 | F | 1 | 1 | —$CH_2C(C_6H_5)H$— | N | O |
| 192 | Cl | 2 | 2 | —CN | 2 | 2 | —$CH_2C(C_6H_5)H$— | N | S |
| 193 | Br | 4 | 4 | | 0 | 0 | —$CH_2C(C_6H_5)H$— | S | N |
| 194 | Cl | 3 | 3 | —$C_6H_2Br_3$ | 1 | 1 | —$CH_2C(C_6H_5)H$— | O | N |
| 195 | Cl | 3 | 3 | —$NO_2$ | 2 | 2 | —$CH_2C(C_6H_5)H$— | N | N |
| 196 | Cl | 2 | 2 | —$OCH_3$ | 1 | 1 | —$CH_2C(C_6H_5)H$— | N | N |
| 197 | Cl | 4 | 4 | —$CH_3$ | 1 | 1 | —$CH_2C(C_6H_5)H$— | O | N |
| 198 | Cl | 3 | 3 | F | 2 | 2 | —$CH_2C(C_6H_5)H$— | S | N |

TABLE I—Continued

| Compound number: | Z | m | m' | A | i | i' | R | M | M' |
|---|---|---|---|---|---|---|---|---|---|
| 199 | Br | 1 | 1 | —C₄H₉ | 1 | 1 | —CH₂C(C₆H₅)H— | S | S |
| 200 | Br | 1 | 1 | —OC₄H₉ | 1 | 1 | —CH₂C(C₆H₅)H— | N | N |
| 201 | Br | 2 | 2 |  | 0 | 0 | H₂C—⟨ ⟩—S—⟨ ⟩—CH₂ | N | N |
| 202 | Br | 2 | 2 |  | 0 | 0 | Same as above | S | S |
| 203 | Cl | 2 | 2 |  | 0 | 0 | do | N | S |
| 204 | Br | 2 | 2 | —CN | 1 | 1 | do | S | O |
| 205 | Br | 2 | 2 | —NO₂ | 1 | 1 | do | O | N |
| 206 | Br | 2 | 2 | —OCH₃ | 1 | 1 | do | N | N |
| 207 | Br | 3 | 3 | —OCH₃ | 1 | 1 | do | O | N |
| 208 | Br | 2 | 2 | —CH₃ | 1 | 1 | do | S | S |
| 209 | Br | 2 | 2 | F | 1 | 1 | do | O | S |
| 210 | Br | 2 | 2 | —N(CH₃)₂ | 1 | 1 | do | N | N |
| 211 | Br | 2 | 2 | —C₆H₅ | 1 | 1 | do | S | S |
| 121 | Br | 2 | 2 | —C₆H₃Br₂ | 1 | 1 | do | N | N |
| 213 | Br | 2 | 2 | —CH₂C₆H₅ | 1 | 1 | do | N | S |
| 214 | Br | 2 | 2 | —CH₂C₆H₃Br₂ | 1 | 1 | do | N | N |
| 215 | Br | 3 | 3 | —C₆H₃Cl₂ | 1 | 1 | do | S | S |
| 216 | Cl | 3 | 3 | F | 1 | 1 | do | N | N |
| 217 | Cl | 2 | 2 | —CN | 2 | 2 | do | N | O |
| 218 | Br | 4 | 4 |  | 0 | 0 | do | N | S |
| 219 | Cl | 3 | 3 | —C₆H₂Br₃ | 1 | 1 | do | O | N |
| 220 | Cl | 3 | 3 | —NO₂ | 2 | 2 | do | S | S |
| 221 | Cl | 2 | 2 | —OCH₃ | 1 | 1 | do | S | N |
| 222 | Cl | 4 | 4 | —CH₃ | 1 | 1 | do | N | N |
| 223 | Cl | 3 | 3 | F | 2 | 2 | do | O | S |
| 224 | Br | 1 | 1 | —C₄H₉ | 1 | 1 | do | N | O |
| 225 | Br | 1 | 1 | —OC₄H₉ | 1 | 1 | do | N | N |

In general, the halogenated aryl compounds are prepared by reacting a halogenated phenol, thiophenol or aryl amine with a halogenated alkane at elevated temperatures in the presence of a basic material such as alkali metal hydroxides, carbonates, bicarbonates, oxides and hydrides. The preferred alkali metals are potassium and sodium. Where one desires to increase, for example, ease of handling the reaction mass, solvents such as ketones (e.g. acetone, methyl ethyl ketone, and methyl iso-butyl ketone), alcohols (e.g. methanol, ethanol, iso-propyl alcohol, butyl alcohol and glycols), aqueous solvents (e.g. water, a mixture of water and alcohol and a mixture of water and ketone), and polar aprotic solvents such as dimethylformamide (DMF), dimethyl sulfoxide (DMSO) and ethers such as tetrahydrofuran (THF), can be employed. The desired end product i.e. the halogenated aryl compound, can be recovered from the reaction mass via various methods such as distillation or crystallization. Where the end product requires recovery via crystallization, various aromatic solvents such as benzene, toluene, xylene, dichlorobenzene and the like can be used.

Specifically, the symmetrical halogenated aryl compounds are prepared, for example, according to the following reactions:

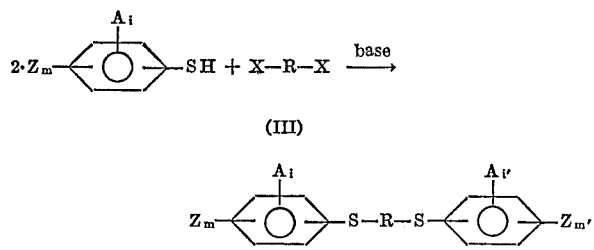

(III)

In the above reaction, X is halogen, preferably chlorine and R is the same as defined herein. Where m and m' and i and i' are different integers, then equivalent molar portions of the particular halogenated phenol, thiophenol or aryl amine are used with equivalent portions of dissimilar halogenated phenol, thiophenol or aryl amine.

The unsymmetrical halogenated aryl compounds are prepared, for example, according to the following reactions:

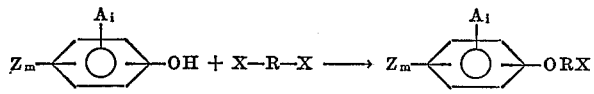

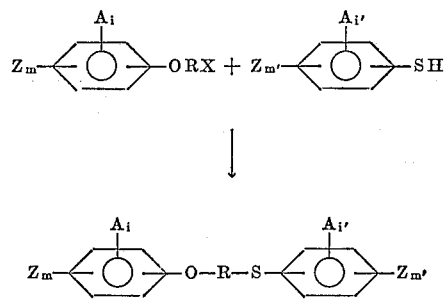

In the above reaction, X and R are the same as mentioned above.

The above reactions are conducted at temperatures ranging from the freezing point of the initial reaction mass to the boiling point thereof. Preferably the temperatures are from about 40° C. to about 200° C. and more preferably from about 50° C. to about 175° C. It is to be understood that the reaction can be conducted under sub-atmospheric (e.g. 1/10–8/10 atmospheres), atmospheric or super-atmospheric (e.g. 1.5–10 atmospheres) pressure. Preferably, the reaction is carried out at atmospheric pressure.

The above described processes can be carried out with conventional, readily available chemical processing equipment. For example, a conventional glass-lined vessel provided with heat transfer means, a reflux condenser and a mechanical stirrer can be advantageously utilized in practicing any of the preferred embodiments of the invention described in the examples set forth herein. The above described processes and resultant products, i.e. the halogenated aryl compounds, are more fully described in the present applicant's copending patent application Ser. No. 330,838 filed Feb. 8, 1973 and which is incorporated herein by reference.

The amount of halogenated aryl compound employed in the present invention compositions is any quantity which will effectively render the polyurethane containing composition flame retardant. In general, the amount used is from about 1% to 25% by weight, based on the total weight of the composition. Preferably, the amount employed is from about 5% to about 20% by weight. It is to be understood that any amount can be used as long as it does not substantially adversely effect the chemical and/or physical and/or mechanical properties of the end polymer composition. The amount utilized, however, is such amount which achieves the objectives described herein.

It is to be understood that the term polyurethanes as used herein means polymers containing repeated urethane linkages

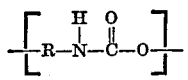

where R is aromatic or aliphatic group. These polymers are generally made by reacting a polyisocyanate with a compound having a plurality of active hydrogens (i.e. a compound having active hydrogen and which gives a positive Zerewitinoff test).

Thus the polyurethanes used in the present invention compositions is any polyurethane herein defined and which one so desires to flame retard. It is to be understood that the polyurethanes used can be a "virgin" material, i.e. substantially free of additives such as stabilizers, plasticizers, dyes, pigments, fillers, and the like, or the polyurethanes can have additives (such as those mentioned and described herein) already contained therein or added concurrently with or after the addition of the halogenated aryl compounds.

Another facet of the present invention relates to the use of certain metal compounds with the halogenated aryl compounds to promote a cooperative effect therebetween and thus enhance the flame retardancy of the resultant plastic composition as compared to the flame retardancy of either one component used separately. These "enhancing agents" are from the group antimony, arsenic, bismuth, tin and zinc-containing compounds. Without limitation, examples of said enhancing agents include $Sb_2O_3$, $SbCl_3$, $SbBr_3$, $SbI_3$, $SbOCl$, $As_2O_3$, $As_2O_5$, $ZnBO_4$, $BaB_2O_4 \cdot H_2O$, $2 \cdot ZnO \cdot 3B_2O_3 \cdot 3 \cdot 5H_2O$ and stannous oxide hydrate. The preferred enhancing agent is antimony trioxide.

The amount of enhancing agent employed in the present invention compositions is any amount which when used with said halogenated aryl compounds will promote a cooperative effect therebetween. In general, the amount employed is from about 1% to about 15%, preferably from about 2% to about 10%, by weight, based on the total weight of plastic composition. Higher amounts can be used as long as the desired end result is achieved.

It is also within the scope of the present invention to employ other materials in the present invention compositions where one so desires to achieve a particular end result. Such materials include, without limitation, adhesion promotors; antioxidants; antistatic agents; antimicrobials; colorants; flame retardants such as those listed on pages 456–458, Modern Plastics Encyclopedia, ibid, (in addition to the new class of flame retardants described herein); heat stabilizers; light stabilizers; pigments; plasticizers; preservatives; ultraviolet stabilizers and fillers.

In this latter category, i.e. fillers, there can be mentioned without limitation, materials such as glass; carbon; cellulosic fillers (wood flour, cork and shell flour); calcium carbonate ( chalk, limestone, and precipitated calcium carbonate); metal flakes; metallic oxides (aluminum, beryllium oxide and magnesia); metallic powders (aluminum, bronze, lead, stainless steel and zinc); polymers (comminuted polymers and elastomer plastic blends); silica products (diatomaceous earth, novaculite, quartz, sand, tripoli, fumed colloidal silica, silica aerogel, wet process silica); silicates (asbestos, kaolimite, mica, nepheline syenite, talc, wollastonite, aluminum silicate and calcium silicate); and inorganic compounds such as barium ferrite, barium sulfate, molybdenum disulfide and silicon carbide.

The above mentioned materials, including fillers, are more fully described in Modern Plastics Encyclopedia, ibid, and which publication is incorporated herein (in toto) by reference.

The amount of the above described materials employed in the present invention compositions can be any quantity which will not substantially adversely effect the desired results derived from the present invention compositions. Thus, the amount used can be zero (0) percent, based on the total weight of the composition, up to that percent at which the composition can still be classified as a plastic. In general, such amount will be from about 0% to about 75% and specifically from about 1% to about 50%.

The halogenated aryl compounds can be incorporated in to the polyurethanes at any processing stage in order to prepare the present invention compositions. In general, this is undertaken prior to fabrication either by physical blending or during the process of forming polyurethanes per se. Where one so desires, the halogenated aryl compounds may be micronized into finely divided particles prior to incorporation into the polyurethanes.

EXAMPLE I

Fourteen separate flexible polyurethane foam compositions (designated Nos. 1–14 in Table II) are prepared via the following procedure; formulation No. 1 is the control and does not contain a halogenated aryl compound.

Approximately 100 grams polyol (Wyandotte's Pluracol GP 3030—a 3,000 mol. wt. triol), 4 grams water, 1.0 grams surfactant (Dow Corning's DC 192—a silicone based material), 0.45 grams amine catalyst (Dabco 33 LV—a triethylene diamine based material) and 18 grams (10.0% by weight, based on the total weight of the foam composition) of each halogenated aryl compound indicated in Table II are mixed in a paper cup with mechanical agitation at 1000 r.p.m. for about 10 seconds. Approximately 0.22 (0.19 ml.) grams of stannous octoate is added via a syringe to the above resultant mixture in the cup. After 5 seconds of agitation, approximately 50 grams (41 ml.) toluene diisocyanate is added via a pipet, the mixture agitated for another 5 seconds and then the overall mixture is discharged into a gallon paper container. The foam is then allowed to rise. After the foam has completely risen, it is allowed to set for about two minutes at 20° C. and then it is post-cured in a forced draft oven at 220° F. for about 12 minutes. Prior to any testing, the foam is allowed to set at room temperature (20–25° C.) for one week.

Portions of the samples of each respective formulation (Nos. 1–14—Table II) prepared according to the above described procedure are then subjected to two different standard flammability tests, i.e. MVSS No. 302 and ASTM D–2863–70. The Motor Vehicle Safety Standard No. 302 is, in general, the application of a burner to a test specimen (strip) for 15 seconds and the timing of the burning for a specified length of the strip. This procedure is fully set forth in Fire Journal, Vol. 66, No. 4, July 1972 pages 34–37 and 44, published by National Fire Protection Association, Boston, Mass., and which is incorporated herein by reference. ASTM No. D–2863–70 is a flammability test which correlates the flammability of a plastic specimen to the available oxygen in its immediate environment; this correlation is stated as an Oxygen Index, O.I., level predicated upon the percent oxygen in the gaseous medium which is required to just provide a steady state of continuous burning of the plastic specimen. This ASTM method is fully described in 1971 Annual Book of ASTM Standards—Part 27, published by the American Society For Testing and Materials, 1916 Race Street, Philadelphia, Pa.; this publication is to be considered as incorporated (in toto) herein by reference.

The results of these flammability tests are shown in Table II.

TABLE II.—FLAMMABILITY DATA FOR POLYURETHANE PLASTIC COMPOSITIONS CONTAINING HALOGENATED ARYL COMPOUNDS

| Formulation number: | Halogenated aryl compound | | Oxygen index, percent | MVSS 302 (in./min.) |
|---|---|---|---|---|
| | Number | Percent | | |
| 1 | | 0 | 17.3 | 4.9 |
| 2 | 1 | 10 | 19.2 | 2.1 |
| 3 | 2 | 10 | 20.0 | 2.4 |
| 4 | 3 | 10 | 21.1 | SE |
| 5 | 4 | 10 | 21.5 | SE |
| 6 | 32 | 10 | 21.8 | SE |
| 7 | 37 | 10 | 19.8 | 2.3 |
| 8 | 65 | 10 | 20.0 | 2.4 |
| 9 | 79 | 10 | 21.1 | SE |
| 10 | 122 | 10 | 21.1 | SE |
| 11 | 143 | 10 | 22.4 | SE |
| 12 | 159 | 10 | 20.0 | 2.4 |
| 13 | 181 | 10 | 19.2 | 2.1 |
| 14 | 205 | 10 | 23.5 | SE |

Referring to Table II, the halogenated aryl number relates to the structural formulae heretofor set forth in Table I; a difference of 2% in the Oxygen Index values is considered significant; and the MVSS 302 values are set forth in burning rates expressed as inches per minute.

The results shown in Table II demonstrate the unique effectiveness of these halogenated aryl as flame retardants for polyurethanes. Specifically, formulation No. 1 (the control) had a O.I. of 17.3 and MVSS 302 value of 4.9. In Nos. 2–14, the use of the particular halogenated aryl results in a significant increase in fire retardancy as measured by O.I. Furthermore, these formulations also had a reduction in MVSS 302 burning rates and in some cases, the material being tested is found to be self-extinguishing (SE).

EXAMPLE II

The use of an enhancing agent such as $Sb_2O_3$ to promote a cooperative effect between such agent and the halogenated aryl is fully demonstrated via the results obtained from repeating in full Example I above with the exception that 1% $Sb_2O_3$ is used in formulation Nos. 2–14. The O.I. values are found to be slightly higher than those obtained in Example I. The MVSS 302 rates are found to be basically the same as those observed in Example I. The other metal containing enhancing agents are also predicted to be effective.

EXAMPLE III

Samples of each of formulation Nos. 1–14 prepared according to the above described procedure of Example I are subjected to the following ASTM test in order to ascertain other properties of the resultant plastic compositions:

(1) Tensile Strength (at break): ASTM Test No. D–1564
(2) Density: ASTM Test No. D–1564
(3) Ultimate Elongation: ASTM Test No. D–1564
(4) Tear Strength: ASTM Test No. D–1564
(5) Compression Deflection: ASTM Test No. D–1564

The aforementioned ASTM Test is a standard test in the art and is utilized collectively in order to ascertain the efficacy of a polymeric system as an overall flame retarded composition for commercial application. This ASTM Test is to be considered as incorporated herein by reference.

The results of this ASTM test shows that the physical properties of the present invention compositions are basically the same (except O.I. and MVSS 302 values) as the plastic material without the flame retardant (i.e. formulation No. 1). Thus, there is no substantial adverse effect on the physical properties of the plastic material when the novel compounds are incorporated therein.

EXAMPLE IV

Samples of each of Formulation Nos. 1 through 14 Table II, are subjected to temperature (thermal) stability tests via the use of thermal gravimetric analysis (TGA). This test employed the use of a "Thermal Balance," model TGS–1, Perkin-Elmer Corporation, Norwalk, Connecticut and an electrical balance, Cahn 2580 model, Cahn Instrument Company, Paramount, Calif. The results of these tests show that the halogenated aryl compound containing Formulations had more than adequate stability for melt processing and subsequent heat aging (i.e. high temperature applications) and thus demonstrating that the particular halogenated aryl are quite compatible with the plastic material. The halogenated aryl compound stability thus aids in providing sufficient flame retardancy at the plastic decomposition temperature. This test also demonstrates that these compounds do not exhibit migration.

In view of the foregoing Examples and remarks, it is seen that the plastic compositions, which incorporate these compounds, possess characteristics which have been unobtainable in the prior art. Thus, the use of these compounds in the above described plastic material as flame retardants therefor is quite unique since it is not possible to predict the effectiveness and functionality of any particular material in any polymer system until it is actively undergone incorporation therein and the resultant plastic composition tested according to various ASTM Standards. Furthermore, it is necessary, in order to have commercial utility, that the resultant flame retarded plastic composition possess characteristics such as being nontoxic. Use of these compounds in the plastic material has accomplished all of these objectives.

The above examples have been described in the foregoing specification for the purpose of illustration and not limitation. Many other modifications and ramifications will naturally suggest themselves to those skilled in the art based on this disclosure. These are intended to be comprehended as within the scope of this invention.

What is claimed is:

1. A plastic composition containing polyurethane having incorporated therein a flame retardant which is a halogenated aryl compound having the formula:

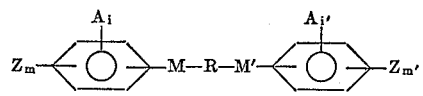

wherein Z is selected from the group consisting of bromine or chlorine; $m$ and $m'$ are integers having a value of 1–5; $i$ and $i'$ are integers having a value of 0–2; M and M' are each independent and are selected from the group consisting of oxygen, nitrogen or sulfur with the proviso that M and M' cannot concurrently be oxygen in both cases and wherein M and/or M' is nitrogen, the formula is

A is selected from the group consisting of chlorine, cyano, nitro, lower alkoxy, lower alkyl, fluorine, dialkylamino, phenyl, halo-phenyl, benzyl, or halo- benzyl; and R is selected from the group consisting of (a) alkylene group having from one to six carbon atoms (b) $CH_2-CH(OH)-CH_2$ (c) $CH_2-CH(CH_2OH)-CH_2$ (d) $(CH_2)_w-O-(CH_2)_w$ where $w=1-6$ (e)  where X=H, Cl, Br $n=4$ (f) $CH_2-C(O)-CH_2$ (g) 

(h) $H_2C-\langle S \rangle-CH_2$ where S=saturated ring

2. The composition as set forth in claim 1 wherein $i$ and $i'$ are both 0.
3. The composition as set forth in claim 1 wherein $i$ and $i'$ are both 1.
4. The composition as set forth in claim 1 wherein $i$ and $i'$ are both 2.
5. A plastic composition containing polyurethane having incorporated therein a flame retardant which is a halogenated aryl compound having the formula:

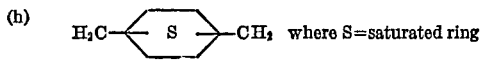

wherein Z is selected from the group consisting of bromine or chlorine; $m$ and $m'$ are integers having a value of 1–5; $i$ and $i'$ are integers having a value of 0–2; A is selected from the group consisting of chlorine, cyano, nitro, lower alkoxy, lower alkyl, fluorine, dialkylamino, phenyl, halophenyl, benzyl, or halo- benzyl; and R is selected from the group consisting of (a) alkylene group having from one to six carbon atoms
(b) $CH_2-CH(OH)-CH_2$
(c) $CH_2-CH(CH_2OH)-CH_2$
(d) $(CH_2)_w-O-(CH_2)_w$ where $w=1-6$
(e) 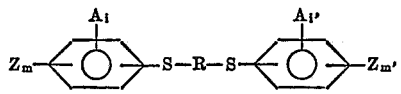 where X=H, Cl, Br $n=4$
(f) $CH_2-C(O)-CH_2$
(g) $CH_2-CH$ (with phenyl ring)
(h) $H_2C-\langle S \rangle-CH_2$ where S=saturated ring 6. The composition as set forth in claim 5 wherein $i$ and $i'$ are both 0.
7. The composition as set forth in claim 5 wherein $i$ and $i'$ are both 1.
8. The composition as set forth in claim 5 wherein $i$ and $i'$ are both 2.
9. The composition as set forth in claim 6 wherein R is an alkylene group having from 1 to 6 carbon atoms.
10. A plastic composition containing polyurethane having incorporated therein a flame retardant which is a halogenated aryl compound having the formula:

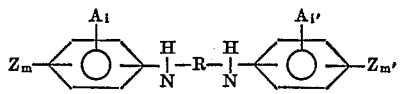

wherein Z is selected from the group consisting of bromine or chlorine; $m$ and $m'$ are integers having a value of 1–5; $i$ and $i'$ are integers having a value of 0–2; A is selected from the group consisting of chlorine, cyano, nitro, lower alkoxy, lower alkyl, fluorine, dialkylamino, phenyl, halo-phenyl, benzyl; or halo-benzyl; and R is selected from the group consisting of (a) alkylene group having from one to six carbon atoms
(b) $CH_2-CH(OH)-CH_2$
(c) $CH_2-CH(CH_2OH)-CH_2$
(d) $(CH_2)_w-O-(CH_2)_w$ where $w=1-6$
(e) 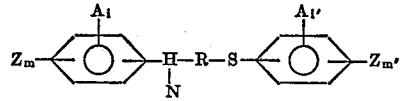 where X=H, Cl, Br $n=4$
(f) $CH_2-C(O)-CH_2$
(g) $CH_2-CH$ (with phenyl ring)
(h) $H_2C-\langle S \rangle-CH_2$ where S=saturated ring 11. The composition as set forth in claim 10 wherein $i$ and $i'$ are both 0.
12. The composition as set forth in claim 10 wherein $i$ and $i'$ are both 1.
13. The composition as set forth in claim 10 wherein $i$ and $i'$ are both 2.
14. The composition as set forth in claim 11 wherein R is an alkylene group having from 1 to 6 carbon atoms.
15. A plastic composition containing polyurethane having incorporated therein a flame retardant which is a halogenated aryl compound having the formula:

$$Z_m-\langle O \rangle-\underset{N}{H}-R-S-\langle O \rangle-Z_{m'}$$

wherein Z is bromine or chlorine, $m$ and $m'$ are integers having a value of 1–5, $i$ and $i'$ are integers having a value of 0–2; A is chlorine, cyano, nitro, lower alkoxy, lower alkyl, fluorine, dialkylamino, phenyl, halo-phenyl, benzyl, or halo-benzyl; and R is selected from the group consisting of (a) alkylene group having from one to six carbon atoms
(b) $CH_2-CH(OH)-CH_2$
(c) $CH_2-CH(CH_2OH)-CH_2$
(d) $(CH_2)_w-O-(CH_2)_w$ where $w=1-6$
(e) $CH_2-\langle O \rangle-CH_2$ where X=H, Cl, Br $n=4$
(f) $CH_2-C(O)-CH_2$
(g) $CH_2-CH$ (with phenyl ring)
(h) $H_2C-\langle S \rangle-CH_2$ where S=saturated ring 16. The composition as set forth in claim 15 wherein $i$ and $i'$ are both 0.
17. The composition as set forth in claim 15 wherein $i$ and $i'$ are both 1.
18. The composition as set forth in claim 15 wherein $i$ and $i'$ are both 2.
19. The composition as set forth in claim 16 wherein R is an alkylene group having from 1 to 6 carbon atoms.

20. A plastic composition containing polyurethane having incorporated therein a flame retardant which is a halogenated aryl compound having the formula:

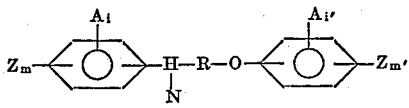

wherein Z is bromine or chlorine, $m$ and $m'$ are integers having a value of 1–5; $i$ and $i'$ are integers having a value of 0–2; A is chlorine, cyano, nitro, lower alkoxy, lower alkyl, fluorine, dialkylamino, phenyl, halo-phenyl, benzyl, or halo-benzyl; and R is selected from the group consisting of (a) alkylene group having from one to six carbon atoms
(b) $CH_2—CH(OH)—CH_2$
(c) $CH_2—CH(CH_2OH)—CH_2$
(d) $(CH_2)_w—O—(CH_2)_w$ where $w=1-6$
(e) $CH_2—\langle\bigcirc\rangle_{X_n}—CH_2$ where X=H, Cl, Br $n=4$
(f) $CH_2—C(O)—CH_2$
(g) $CH_2—CH$ with phenyl ring
(h) $H_2C—\langle\ S\ \rangle—CH_2$ where S=saturated ring 21. The composition as set forth in claim 20 wherein $i$ and $i'$ are both 0.
22. The composition as set forth in claim 20 wherein $i$ and $i'$ are both 1.
23. The composition as set forth in claim 20 wherein $i$ and $i'$ are both 2.
24. The composition as set forth in claim 21 wherein R is an alkylene group having from 1 to 6 carbon atoms.
25. A plastic composition containing polyurethane having incorporated therein a flame retardant which is a halogenated aryl compound having the formula:

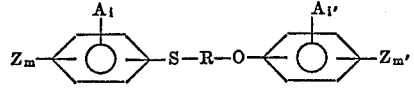

wherein Z is bromine or chlorine, $m$ and $m'$ are integers having a value of 1–5; $i$ and $i'$ are integers having a value of 0–2; A is chlorine, cyano, nitro, lower alkoxy, lower alkyl, fluorine, dialkylamino, phenyl, halo-phenyl, benzyl, or halo-benzyl; and R is selected from the group consisting of (a) alkylene group having from one to six carbon atoms
(b) $CH_2—CH(OH)—CH_2$
(c) $CH_2—CH(CH_2OH)—CH_2$
(d) $(CH_2)_w—O—(CH_2)_w$ where $w=1-6$
(e) $CH_2—\langle\bigcirc\rangle_{X_n}—CH_2$ where X=H, Cl, Br $n=4$
(f) $CH_2—C(O)—CH_2$
(g) $CH_2—CH$ with phenyl ring
(h) $H_2C—\langle\ S\ \rangle—CH_2$ where S=saturated ring 26. The composition as set forth in claim 25 wherein $i$ and $i'$ are both 0.
27. The composition as set forth in claim 25 wherein $i$ and $i'$ are both 1.
28. The composition as set forth in claim 25 wherein $i$ and $i'$ are both 2.
29. The composition as set forth in claim 26 wherein R is an alkylene group having from 1 to 6 carbon atoms.

References Cited
UNITED STATES PATENTS

| | | | |
|---|---|---|---|
| 3,385,819 | 5/1968 | Gouinlock | 260—45.75 R |
| 3,560,441 | 2/1971 | Schwarcy et al. | 260—45.7 R |
| 3,658,634 | 4/1972 | Yanagi et al. | 161—403 |
| 3,717,609 | 2/1973 | Kutner | 260—45.95 G |

M. J. WELSH, Primary Examiner

U.S. Cl. X.R.

260—37 N, 45.75 R